United States Patent
Albsmeier et al.

(10) Patent No.: US 8,829,855 B2
(45) Date of Patent: Sep. 9, 2014

(54) POWER GENERATION SYSTEM THAT OPTIMIZES THE POWER PROVIDED TO START A GENERATOR

(71) Applicant: Kohler Co., Kohler, WI (US)

(72) Inventors: Eric D. Albsmeier, Sheboygan, WI (US); Richard A. Mauk, Sheboygan, WI (US); Harrison C. Chiu, Grafton, WI (US)

(73) Assignee: Kohler Co., Kohler, WI (US)

( * ) Notice: Subject to any disclaimer, the term of this patent is extended or adjusted under 35 U.S.C. 154(b) by 94 days.

(21) Appl. No.: 13/627,056

(22) Filed: Sep. 26, 2012

(65) Prior Publication Data

US 2014/0084598 A1     Mar. 27, 2014

(51) Int. Cl.
*H02J 7/00* (2006.01)

(52) U.S. Cl.
USPC ............ 320/126; 320/127; 320/128; 320/132

(58) Field of Classification Search
CPC ..................................................... H02J 7/1423
USPC ................................................ 320/109, 126
See application file for complete search history.

(56) References Cited

U.S. PATENT DOCUMENTS

| | | | |
|---|---|---|---|
| 5,122,722 A | 6/1992 | Goedken et al. | |
| 5,166,596 A | 11/1992 | Goedken | |
| 5,206,579 A | 4/1993 | Kawate et al. | |
| 5,420,493 A | 5/1995 | Hargadon et al. | |
| 5,504,416 A | 4/1996 | Holloway et al. | |
| 5,659,240 A | 8/1997 | King | |
| 6,215,282 B1 | 4/2001 | Richards et al. | |
| 6,222,343 B1 | 4/2001 | Crisp et al. | |
| 6,229,279 B1 * | 5/2001 | Dierker | 320/104 |
| 6,331,761 B1 | 12/2001 | Kumar et al. | |
| 6,333,619 B1 | 12/2001 | Chavez et al. | |
| 6,831,464 B2 | 12/2004 | Yang | |
| 6,930,469 B2 | 8/2005 | Krieger et al. | |

(Continued)

FOREIGN PATENT DOCUMENTS

| | | |
|---|---|---|
| DE | 102008051078 A1 | 4/2009 |
| EP | 1568533 A1 | 8/2005 |
| JP | 2005-0264860 A | 9/2005 |
| JP | 2012-147633 A | 8/2012 |

OTHER PUBLICATIONS

"European Application Serial No. 13180339.7, European Search Report dated Dec. 4, 2013", 8 pgs.

(Continued)

*Primary Examiner* — Edward Tso
*Assistant Examiner* — Ahmed Omar
(74) *Attorney, Agent, or Firm* — Schwegman, Lundberg & Woessner, P.A.

(57) ABSTRACT

Some embodiments relate to a power generation system. The power generation system includes a first generator and a first battery charger. The first battery charger is adapted to charge a first battery and a second battery. The first battery and the second battery are each adapted to provide power to start the first generator. The power generation system further includes a controller that determines a state of charge for each of the first battery and the second battery. Based on the state of charge for each of the first battery and the second battery, the controller determines which of the first battery and the second battery receives charging current from the first battery charger.

20 Claims, 6 Drawing Sheets

(56) References Cited

U.S. PATENT DOCUMENTS

| | | |
|---|---|---|
| 7,061,209 B2 | 6/2006 | Mori |
| 7,208,915 B2 | 4/2007 | Kubota et al. |
| 7,456,611 B2 | 11/2008 | Mullett et al. |
| 7,573,145 B2 | 8/2009 | Peterson |
| 7,855,466 B2 | 12/2010 | Bax |
| 7,999,405 B2 | 8/2011 | Peterson |
| 8,022,572 B2 | 9/2011 | Vyas et al. |
| 8,169,755 B2 | 5/2012 | Sugita |
| 2007/0276547 A1 * | 11/2007 | Miller .......................... 700/295 |
| 2008/0231117 A1 * | 9/2008 | Bucur et al. .................... 307/48 |
| 2010/0253290 A1 | 10/2010 | Hammerstrom |
| 2011/0084650 A1 | 4/2011 | Kaiser et al. |
| 2011/0101778 A1 | 5/2011 | Yang |
| 2011/0175357 A1 | 7/2011 | Navetta |
| 2011/0175367 A1 | 7/2011 | Matsumoto |
| 2011/0215641 A1 | 9/2011 | Peterson et al. |
| 2011/0227537 A1 | 9/2011 | Maleus |
| 2011/0241611 A1 | 10/2011 | Watanabe et al. |
| 2013/0073126 A1 | 3/2013 | Kumar et al. |

OTHER PUBLICATIONS

"European Application Serial No. 13183671.0, European Search Report mailed Jan. 31, 2014", 11 pgs.

* cited by examiner

US 8,829,855 B2

POWER GENERATION SYSTEM THAT OPTIMIZES THE POWER PROVIDED TO START A GENERATOR

TECHNICAL FIELD

Embodiments pertain to a power generation system, and more particularly to a power generation system that optimizes the power provided to start a generator.

BACKGROUND

Power generation systems are used to selectively provide power to various types of power consuming loads. Some power generation systems include batteries that are used to start engines and/or generators within the power generation system. One common cause of generator malfunction is that the starting batteries do not provide sufficient starting current.

The starting batteries in such conventional power generation systems are typically either charged by a primary power source or a secondary power source (e.g., the generator) when the primary power source becomes unavailable. These types of systems often include a battery charger that charges the starting battery.

One of drawbacks with existing power generation systems is that the power generation system often tries to start the generator using a starting battery that is unable to provide sufficient starting current to the generator's starter. Therefore, the secondary power source may be unavailable when the primary power source becomes unavailable.

Another drawback with existing power generation systems is that the generator's starter in such power generation systems is typically unable to draw power from additional sources when the starting battery is unable to provide sufficient starting current to the generator's starter. Therefore, the secondary power source may be unavailable when the primary power source becomes unavailable.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
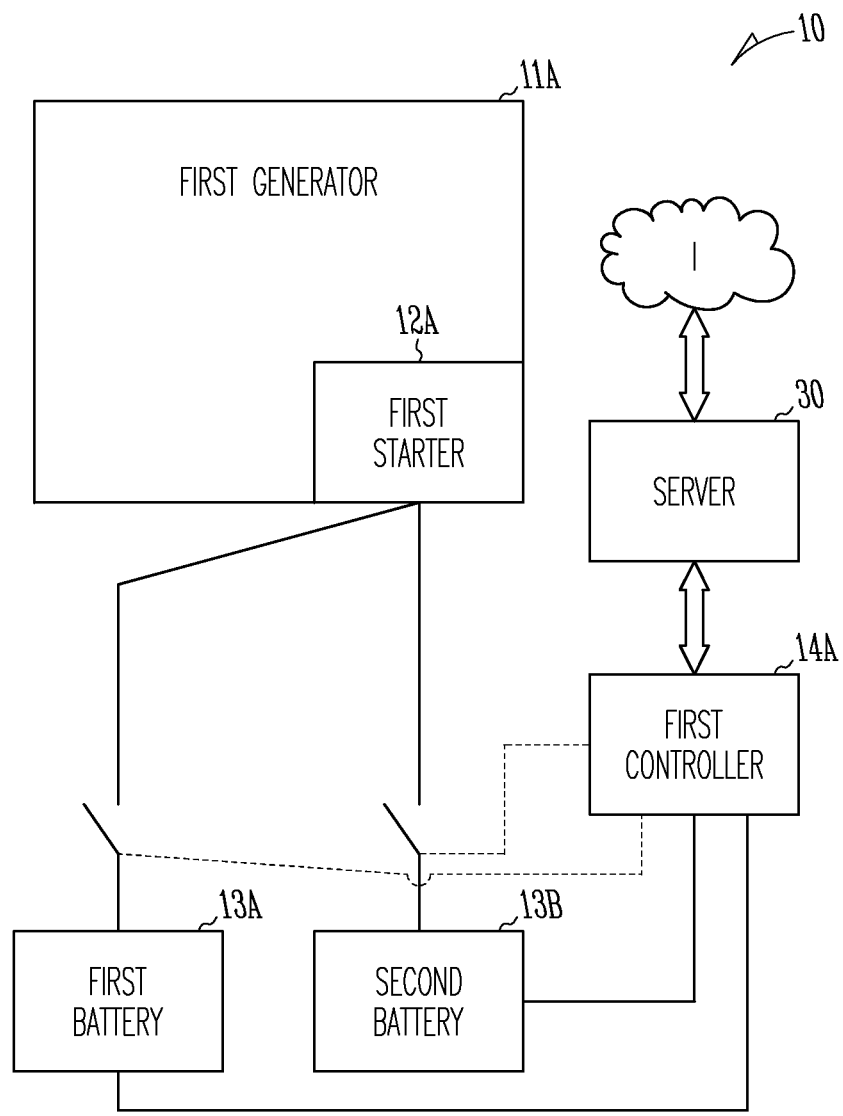
FIG. 1 is a functional block diagram illustrating an example power generation system that optimizes the power provided to start a generator.

FIG. 1 is a functional block diagram illustrating an example power generation system 10. The power generation system 10 includes a first generator 11A and a first starter 12A that activates the first generator 11A.

The power generation system 10 further includes a first battery 13A that is adapted to provide power to the first starter 12A and a second battery 13B adapted to provide power to the first starter 12A. A controller 14A determines a state of charge for each of the first battery 13A and the second battery 13B such that the controller 14A determines which of the first battery 13A and second battery 13B provides power to the first starter 12A.

It should be noted that the controller 14A may command the first battery 13A and/or the second battery 13B to provide power to the first starter 12A. The first controller 14A will determine whether (i) the first battery 13A; (ii) the second battery 13B; or (iii) the first and second batteries 13A, 13B together supply current to first starter 12A based on a variety of factors (e.g., the charge level of each of the first and second batteries 13A, 13B).

Figure 2:
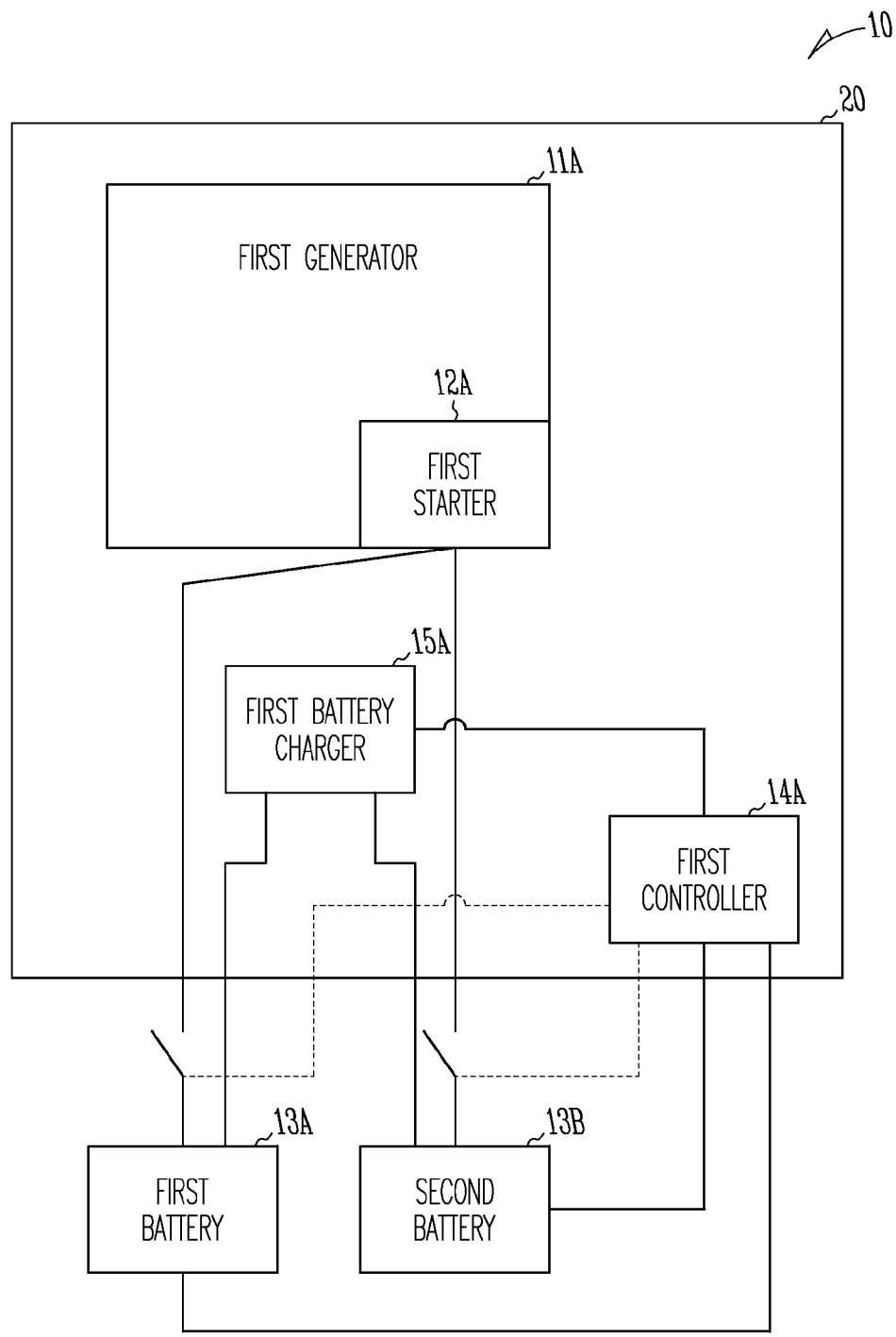
FIG. 2 is a functional block diagram similar to FIG. 1 where the controller, a first generator and a first battery charger of the example power generation system are all within the same enclosure.

In the example embodiment that is shown in FIG. 2, the power generation system 10 further includes a first battery charger 15A that supplies current to the first battery 13A and the second battery 13B. The controller 30 determines which of the first battery 13A and the second battery 13B receives charging current from the first battery charger 15A (e.g., based on the state of charge for each of the first battery 13A and the second battery 13B).

It be noted that the first battery charger 15A may be a stand-alone device (as shown in the FIGS.) or a battery charging alternator. The type of first battery charger 15A that is included in the power generation system 10 will depend in part on the application where the power generation system 10 is to be used (among other factors).

In some embodiments, the first generator 11A includes an internal combustion engine that drives an alternator. It should be noted that other types of generators (i.e., power generation devices) are contemplated without departing from the scope of the invention.

Embodiments are contemplated where the first battery charger 15A is adapted to receive power from a primary power source (not shown). As examples, the primary power source may be utility power or another electrochemical power source (i.e., battery).

In some embodiments, the controller 14A is a generator controller that operates the first generator 11A. Embodiments are also contemplated where the controller 14A operates the first battery charger 15A, or is a stand-alone device (as shown in FIG. 1).

It should be noted that the controller 14A may display information relating to operation of the power generation system 10. As an example, the first controller 14A may display a charge level of the first battery 13A and the second battery 13B. In addition, the controller 14A may display information relating to an optimum starting scenario that indicates which of the first battery 13A and the second battery 13B provide power to the first starter 12A (among other operating parameters that are associated with the power generation system 10).

As another example, the first controller 14A may display the voltage, current and/or temperature at the battery terminals of the first battery 13A and the second battery 13B (or some other part of the batteries). As yet another example, the first controller 14A may display faults, warnings and/or other conditions relating to the health of the first battery 13A, the second battery 13B, the first battery charger 15A and/or the first generator 11A.

In the example embodiment that is illustrated in FIG. 1, the controller 14A and the first generator 11A are not located within the same enclosure (although they could be in the same enclosure in other embodiments). In the example embodiment that is illustrated in FIG. 2, the first battery charger 15A, the controller 14A and the first generator 11A are all located within the same enclosure 20 (although they could be in different enclosure(s) in other embodiments).

Figure 3:
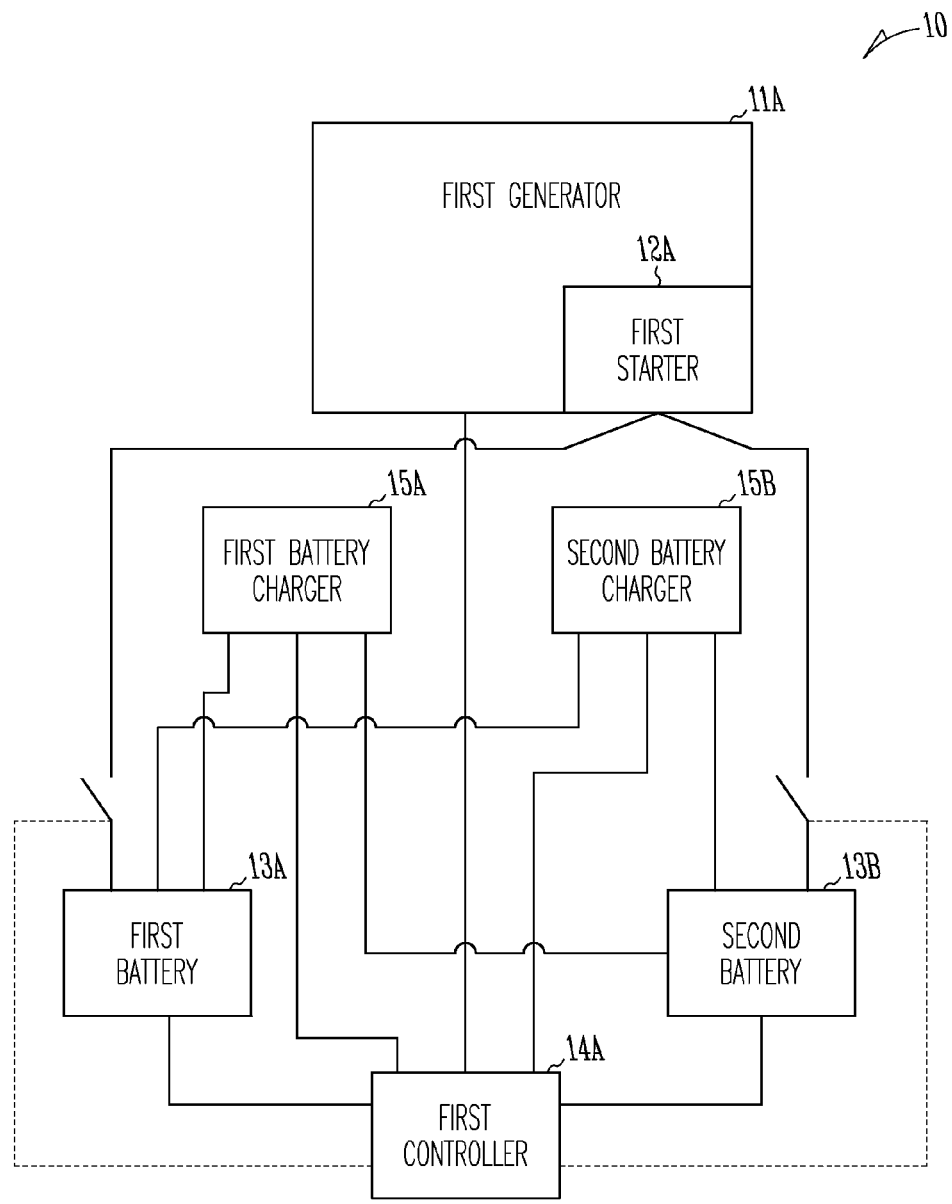
FIG. 3 is a functional block diagram similar to FIG. 1 where the power generation system includes a plurality of battery chargers.

In the example embodiment that is illustrated in FIG. 3, the power generation system 10 further includes a second battery charger 15B that charges the first battery 13A and/or the second battery 13B. It should be noted that although only two battery chargers 15A, 15B are shown in FIG. 3, any number of battery chargers may be included in the power generation system 10.

Figure 4:
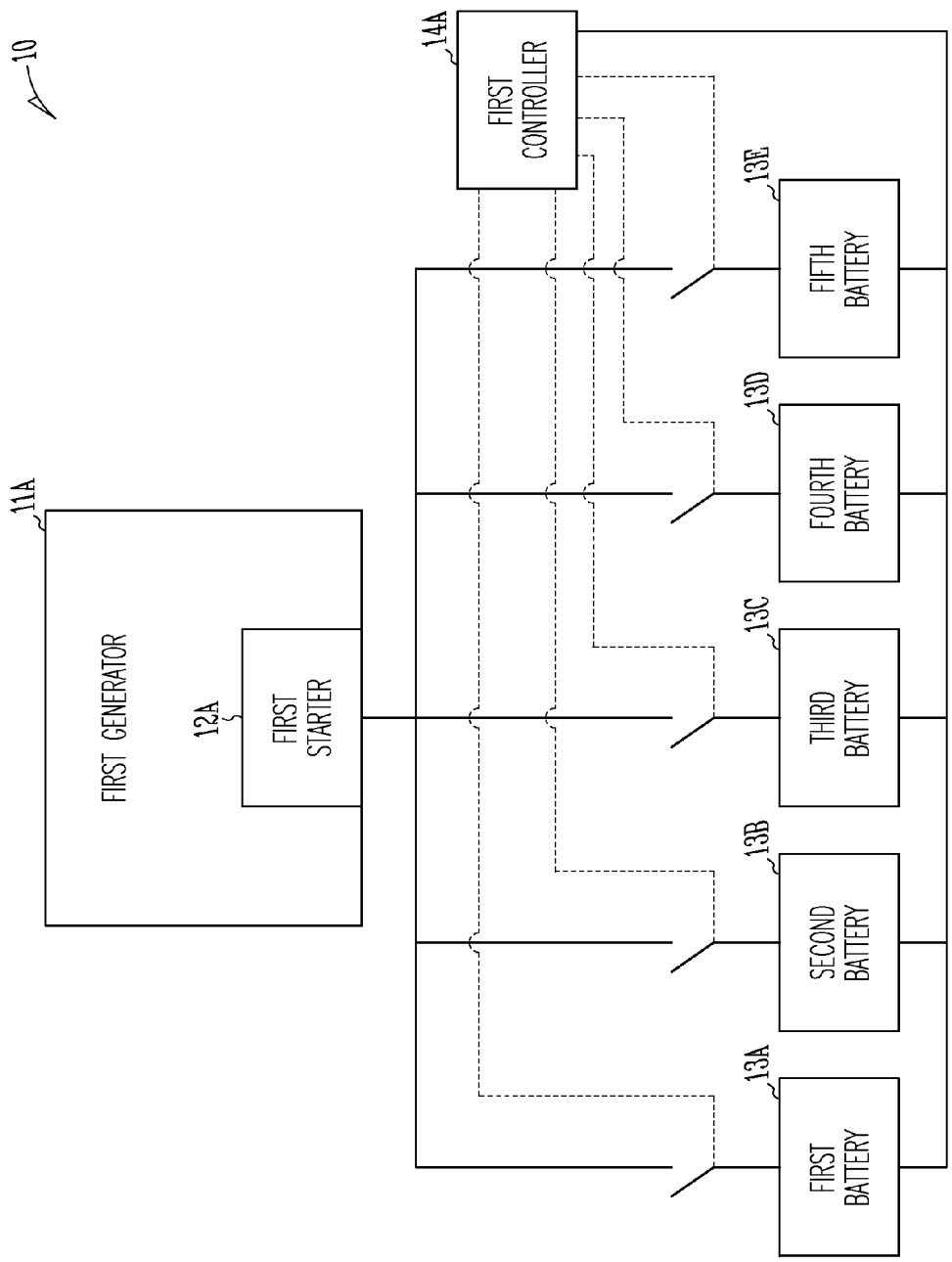
FIG. 4 is a functional block diagram similar to FIG. 1 where the power generation system includes multiple batteries.

In the example embodiment that is illustrated in FIG. 4, the power generation system 10 includes a plurality of batteries 13A, 13B, 13C, 13D, 13E such that the controller 14A determines which of the plurality of batteries 13A, 13B, 13C, 13D, 13E provides power to the first starter 12A. It should be noted that the controller 14A determines that a particular one, some or all of the plurality of batteries 13A, 13B, 13C, 13D, 13E provide power to the first starter 12A.

Figure 5:
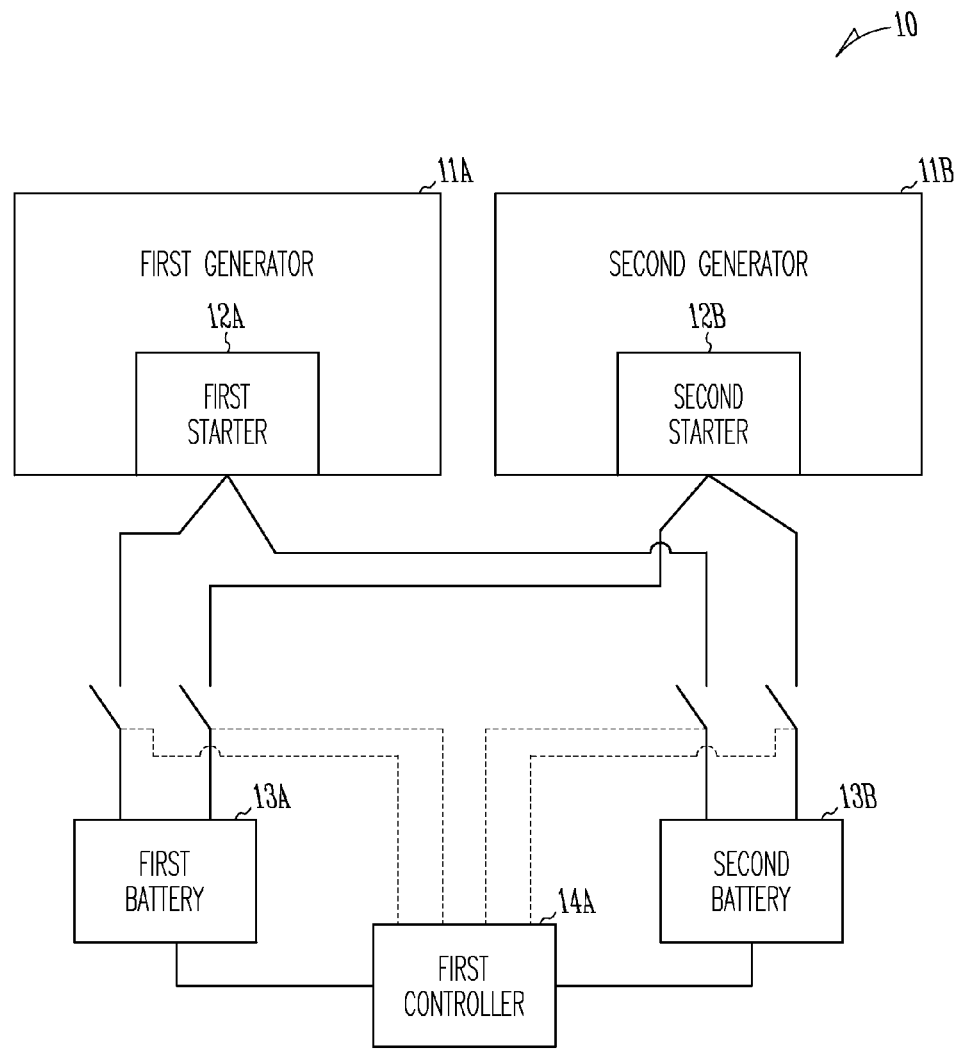
FIG. 5 is a functional block diagram similar to FIG. 1 where the power generation system includes a plurality of generators.

FIG. 5 is a functional block diagram where the power generation system 10 includes a first generator 11A and a second generator 11B. The power generation system 10 further includes a first starter 12A that activates the first generator and a second starter 12B that activates the second generator 11B. In the example embodiment that is illustrated in FIG. 5, the first controller 14A determines whether (i) one or both of the first battery 13A and the second battery 13B provide power to the first starter 12A; and (ii) one or both of the first battery 13A and the second battery 13B provide power to the second starter 12B.

Figure 6:
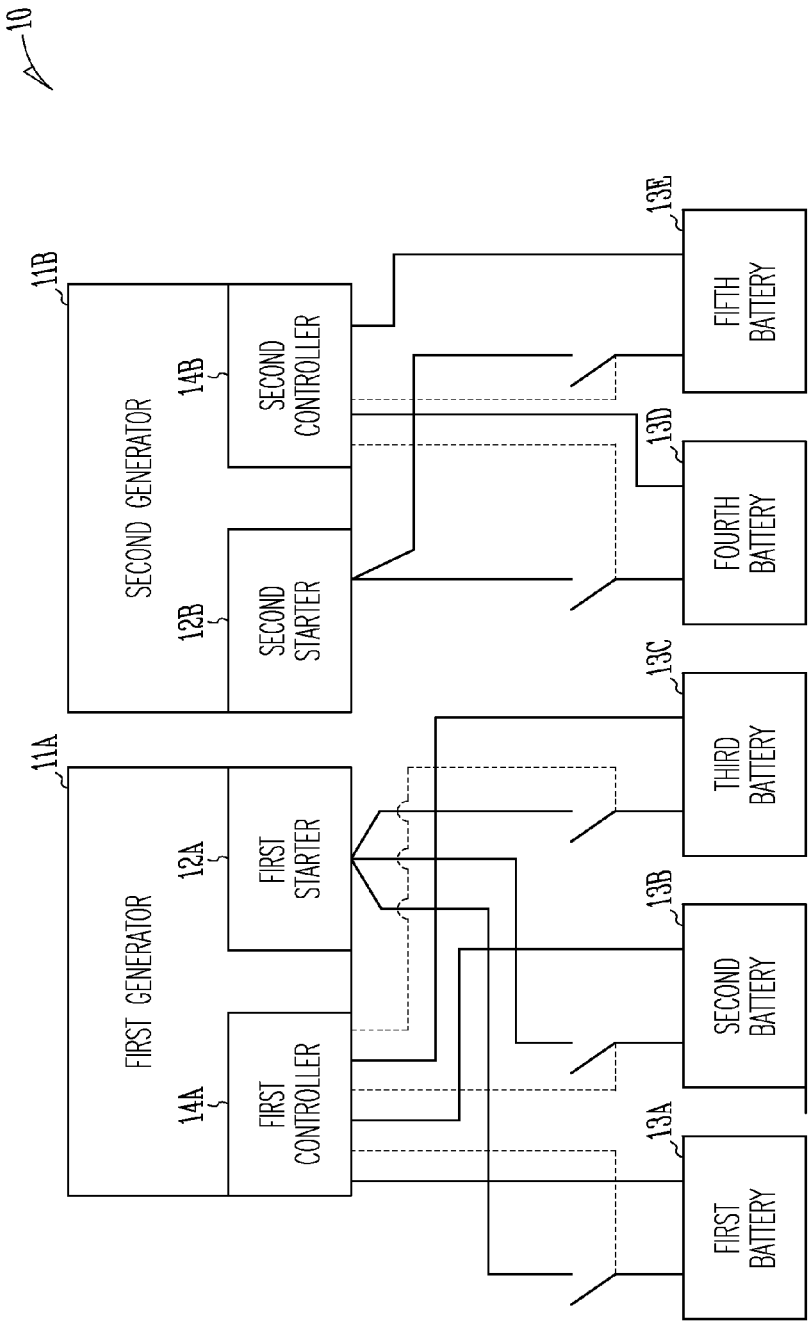
FIG. 6 is a functional block diagram similar to FIG. 1 where the power generation system includes a plurality of generators and multiple batteries.

FIG. 6 is a functional block diagram where the power generation system 10 includes a plurality of generators 11A, 11B and multiple batteries 13A, 13B, 13C, 13D, 13E. One, some or all of the batteries 13A, 13B, 13C, 13D, 13E may provide power to the first starter 12A. In addition, one, some or all of the multiple batteries 13A, 13B, 13C, 13D, 13E may provide power to the second starter 12B.

In the example embodiment that is illustrated in FIG. 6, a first group of batteries 13A, 13B, 13C in the plurality of batteries 13A, 13B, 13C, 13D, 13E is adapted to provide power to the first starter 12A. In addition, a second group of batteries 13D, 13E in the plurality of batteries 13A, 13B, 13C, 13D, 13E is adapted to provide power to the second starter 12B. The controller(s) 14A, 14B may determine (i) which of the plurality of batteries 13A, 13B, 13C, 13D, 13E in the first group of batteries 13A, 13B, 13C provides power to the first starter 12A; and (ii) which of the plurality of batteries 13A, 13B, 13C, 13D, 13E in the second group of batteries 13D, 13E provides power to the second starter 12B.

As shown in FIG. 6, the power generation system 10 includes a first controller 14A that operates the first generator 11A and determines which of the plurality of batteries 13A, 13B, 13C, 13D, 13E in the first group of batteries 13A, 13B, 13C provides power to the first starter 12A. In addition, the power generation system 10 includes a second controller 14B that operates the second generator 11B and determines which of the plurality of batteries 13A, 13B, 13C, 13D, 13E in the second group of batteries 13D, 13E provides power to the second starter 12B.

It should be noted that any battery charger and controllers that are included in the power generation system 10 may exchange data via a communication bus that connects the controller(s) and/or the battery charger(s). In addition, the battery charger(s) and/or controller(s) may exchange data wirelessly.

Referring again to FIG. 1, the power generation system 10 further includes a server 30 that is connected to the controller 14A over a network (e.g., the Internet I, a local network and/or wireless forms of communication). In some embodiments, the server 30 provides commands to the controller 14A as to which of the first battery 13A and second battery 13B supplies current to the first starter 12A.

It should be noted that the server 30 may be included in the other embodiments that are shown in FIGS. 2-6 such that the server 30 provides commands to one or more of the controllers 14A, 14B as to which of the multiple batteries 13A, 13B, 13C, 13D, 13E supplies current to which of the first and second starters 12A, 12B (or any other starters that may be included in the power generation system 10). In addition, the server 30 may communicate directly with at least one of the first and second battery chargers 15A, 15B (or any other battery chargers that may be included in the power generation system 10).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A power generation system comprising:
a first generator;
a first starter that activates the first generator;
a first battery adapted to provide power to the first starter;
a second battery adapted to provide power to the first starter; and
a controller that determines a state of charge for each of the first battery and the second battery, wherein the controller determines which of the first battery and second battery provides power to the first starter by selectively operating a first switch that is between the first battery and the first starter and a second switch that is between the second battery and the first starter.

2. The power generation system of claim 1, wherein the controller commands the first battery and the second battery to provide power to the first starter.

3. The power generation system of claim 1, wherein the controller is a generator controller that operates the first generator.

4. The power generation system of claim 1, further comprising a first battery charger that supplies current to the first battery and the second battery.

5. The power generation system of claim 1, wherein the first battery charger is a battery charging alternator.

6. The power generation system of claim 5, wherein the first battery charger is selectively connected to a primary power source or the first generator.

7. The power generation system of claim 6, wherein the primary power source is utility power.

8. The power generation system of claim 6, wherein the primary power source is an electrochemical power source.

9. The power generation system of claim 1, wherein the controller is part of the first battery charger.

10. A power generation system comprising:
a first generator;
a first starter that activates the first generator;
a first battery adapted to provide power to the first starter;
a second battery adapted to provide power to the first starter; and
a controller that determines a state of charge for each of the first battery and the second battery, wherein the controller determines which of the first battery and second battery provides power to the first starter, wherein the controller displays information relating to an optimum starting scenario that indicates which of the first battery and the second battery provide power to the first starter.

11. The power generation system of claim 1, further comprising an enclosure such that the first generator, the controller, and first battery charger are within the enclosure.

12. The power generation system of claim 4, further comprising a second battery charger that charges at least one of the first battery and the second battery, and wherein the first battery charger charges at least one of the first battery and the second battery.

13. The power generation system of claim 1, further comprising a plurality of batteries, wherein the controller determines which of the plurality of batteries provides power to the first starter.

14. The power generation system of claim 13, wherein the controller determines that each of the plurality of batteries provide power to the first starter.

15. The power generation system of claim 1, further comprising a server that is connected to the controller over a network, wherein the server determines which of the first battery and second battery provide power to the first starter.

16. A power generation system comprising:
a first generator;
a first starter that activates the first generator;
a second generator;
a second starter that activates the second generator;
a first battery adapted to provide power to the first starter and the second starter;
a second battery adapted to provide power to the first starter and the second starter; and
a controller that determines a state of charge for each of the first battery and the second battery, wherein the controller determines which of the first battery and second battery provide power to the first starter and which of the first battery and second battery provide power to the second starter by selectively operating a first switch that is between the first battery and the first starter and a second switch that is between the second battery and the first starter and by selectively operating a third switch that is between the first battery and the second starter and a fourth switch that is between the second battery and the second starter.

17. The power generation system of claim 16, wherein the controller commands the first battery and the second battery to provide power to the first starter, and wherein the controller commands the first battery and the second battery to provide power to the second starter.

18. The power generation system of claim 16, further comprising a plurality of batteries, wherein a first group of batteries in the plurality of batteries is adapted to provide power to the first starter, a second group in the plurality of batteries is adapted to provide power to the second starter, wherein the controller determines which of the plurality of batteries in the first group of batteries provides power to the first starter, and wherein the controller determines which of the plurality of batteries in the second group of batteries provides power to the second starter.

19. The power generation system of claim 18, wherein the controller includes a first controller that operates the first generator and determines which of the plurality of batteries in the first group of batteries provides power to the first starter, and a second controller that operates the second generator and determines which of the plurality of batteries in the second group of batteries provides power to the second starter.

20. The power generation system of claim 16, wherein the first battery and the second battery are part of a plurality of batteries, wherein the controller determines which of the batteries in the plurality of batteries provides power to the first starter and the second starter.

* * * * *